United States Patent [19]

Syria

[11] 3,843,207

[45] Oct. 22, 1974

[54] CONTROL SYSTEM REGULATED BRAKING ARRANGEMENT

[75] Inventor: Ronald L. Syria, Utica, Mich.

[73] Assignee: Borg-Warner Corporation, Chicago, Ill.

[22] Filed: June 2, 1972

[21] Appl. No.: 259,126

[52] U.S. Cl...... 303/21 CG, 188/181 A, 303/21 AF
[51] Int. Cl............................................... B60t 8/12
[58] Field of Search ............ 188/181 A; 303/20, 21; 324/162; 340/262, 53; 307/10 R; 317/5

[56] References Cited
UNITED STATES PATENTS

| | | | |
|---|---|---|---|
| 3,494,671 | 2/1970 | Slavin et al. | 303/21 P |
| 3,507,544 | 4/1970 | Wakamatsu et al. | 303/21 CG |
| 3,578,819 | 5/1971 | Atkins | 303/21 P UX |
| 3,582,151 | 6/1971 | Ruof et al. | 303/21 R |
| 3,652,137 | 3/1972 | Fink et al. | 303/21 CG |
| 3,707,311 | 12/1972 | Sharp | 303/21 CG |
| 3,709,567 | 1/1973 | Van Ostrom et al. | 303/21 BE |

Primary Examiner—Trygve M. Blix
Assistant Examiner—Stephen G. Kunin
Attorney, Agent, or Firm—James J. Jennings, Jr.

[57] ABSTRACT

A regulated braking system for a vehicle with a plurality of wheels includes a fluid under pressure for selectively actuating the vehicle brakes when a brake pedal or other actuator is displaced to energize the system. Sensors are positioned adjacent different wheels to provide wheel velocity indicating signals for passage through respective conversion circuits, thus providing analog control voltages denoting respective wheel velocities. A wheel select circuit receives all the wheel velocity control signals and passes only one of the control signals to a signal processing circuit. In this circuit an output signal is provided when a change in the control signal signifies an excessive deceleration of one wheel. In turn this output signal operates a pressure relief unit to relieve the braking system pressure and prevent wheel lock-up.

A quick-charge circuit rapidly establishes an initial value of the control signal when the braking command is first issued. A blanking circuit prevents operation of the signal processing circuit while the quick-charge circuit operates. A dump extend circuit prolongs the pressure relief interval in the braking system when the wheel speed falls below a predetermined threshold value at the same time that an output signal is being provided to relieve the braking system pressure.

6 Claims, 4 Drawing Figures

CONTROL SYSTEM REGULATED BRAKING ARRANGEMENT

BACKGROUND OF THE INVENTION

In the brake art, regulated braking arrangements have been developed in an effort to avoid wheel lock-up with consequent skidding of the vehicle, loss of control, and extension of the stopping distance. Work was done in connection with railroad systems, both in the brakes of individual cars and for the driving wheels of steam locomotives. In addition, much work has been done in connection with aircraft to enhance the stability of the stop and reduce the stopping distance. However such systems have generally been large and complex, and sometimes relied upon information — such as provided by the freerolling nose wheel of an aircraft — not readily available in a conventional automotive type vehicle, whether passenger car or truck.

Recent government regulations for certain regulated braking systems indicate at least some of the systems must be energized only when the braking command is issued, for example, by depression of the brake pedal or movement of a hand control. This poses the additional problem of rapidly energizing the system, and bringing the wheel velocity signal (or signals) rapidly from zero to the actual wheel velocity value. Moreover for systems in which the foundation brakes have a large hysteresis, or where operation on a road surface with a low coefficient of friction may be required, known systems for periodically relieving the braking pressure have not proved effective at low wheel velocity levels.

Another problem in this art not satisfactorily solved to date is the provision of a decision-type arrangement for selecting the higher (or lower, when desired) wheel velocity value as that one which will be evaluated to determine when the brake pressure should be relieved to prevent wheel lock-up.

It is therefore a principal consideration of this invention to provide a control system for a regulated braking arrangement which includes means for rapidly establishing an initial wheel velocity signal which is then very rapidly translated into the actual wheel velocity signal.

A corollary consideration is the prevention of false signals from the control system during this initial time period after the energizing signal has been provided, until the wheel velocity signal has been established and stabilized.

Yet another important consideration is the provision of a circuit for extending the pressure release time in the braking system when the wheel velocity falls below a threshold level at a time when the braking pressure is being relieved. This consideration is particularly important in connection with road surfaces with a low coefficient of friction, and for vehicles where the hysteresis of the foundation brakes is an appreciable factor.

Another salient consideration of this invention is the means for selecting the higher (or highest) or lower (or lowest) of a plurality of wheel velocity-indicating signals, to provide a single control signal for processing to determine whether the braking pressure should be relieved.

SUMMARY OF THE INVENTION

The present invention is particularly useful in conjunction with a vehicle which has a plurality of wheels, and a braking system which includes a fluid under pressure. Means such as a brake pedal, hand operated control lever, or other device is included to provide an energizing signal as the driver issues a command to operate the braking system.

The control system of the invention includes a first sensor, positioned to provide an indication of wheel velocity. A first conversion circuit is coupled to this sensor, for providing a first control signal which varies as a function of the wheel velocity. A signal processing circuit is connected to receive the control signal, and to provide an output signal responsive to a change in the control signal signifying that the rate of change of the wheel velocity has exceeded a preset value. A pressure relief unit is connected to change the braking system pressure responsive to receipt of the output signal.

In accordance with one important aspect of this invention, the control system includes a quick-charge circuit, coupled to the conversion circuit, for rapidly establishing an initial value of the control signal upon issuance of the command to operate the braking system. This reduces the time interval required for the control signal to denote the actual wheel velocity. In addition a blanking circuit is coupled to the signal processing circuit, for preventing operation of the signal processing circuit until an initial value of the control signal has been established in the conversion circuit. This precludes erroneous actuation of the pressure relief unit as the control system initially receives the energizing signal.

Another important component of the control system is a dump extend circuit, connected to receive both a first input signal which varies as a function of the speed-related control signal and a second input signal which indicates that the output signal is then being supplied to the pressure relief unit. The dump extend circuit modifies operation of the signal processing circuit so as to prolong the duration of the output signal whenever the first input signal drops below a predetermined threshold value at the same time that the second input signal is being received.

The control system may also include a second sensor and a second conversion circuit, for providing a second control signal which varies as a function of another wheel velocity. When more than one control signal is provided, a wheel select circuit is connected to receive all the control signals and to pass only one control signal to the signal processing circuit. With this arrangement an output signal is provided responsive to a change in the received control signal, signifying that the rate of change of the selected wheel velocity represented by the received control signal has exceeded a preset value.

THE DRAWINGS

In the several figures of the drawings, like reference numerals identify like components, and in the drawings.

GENERAL SYSTEM DESCRIPTION

The control system of the present invention is useful with a multi-wheel vehicle, and has particular utility in vehicles such as passenger cars and large trucks of the tractortrailor type which employ a braking system including a fluid under pressure, whether a gas such as air or a hydraulic fluid. A preferred embodiment of the invention will be described in conjunction with portions of a truck braking system.

Figure 1:
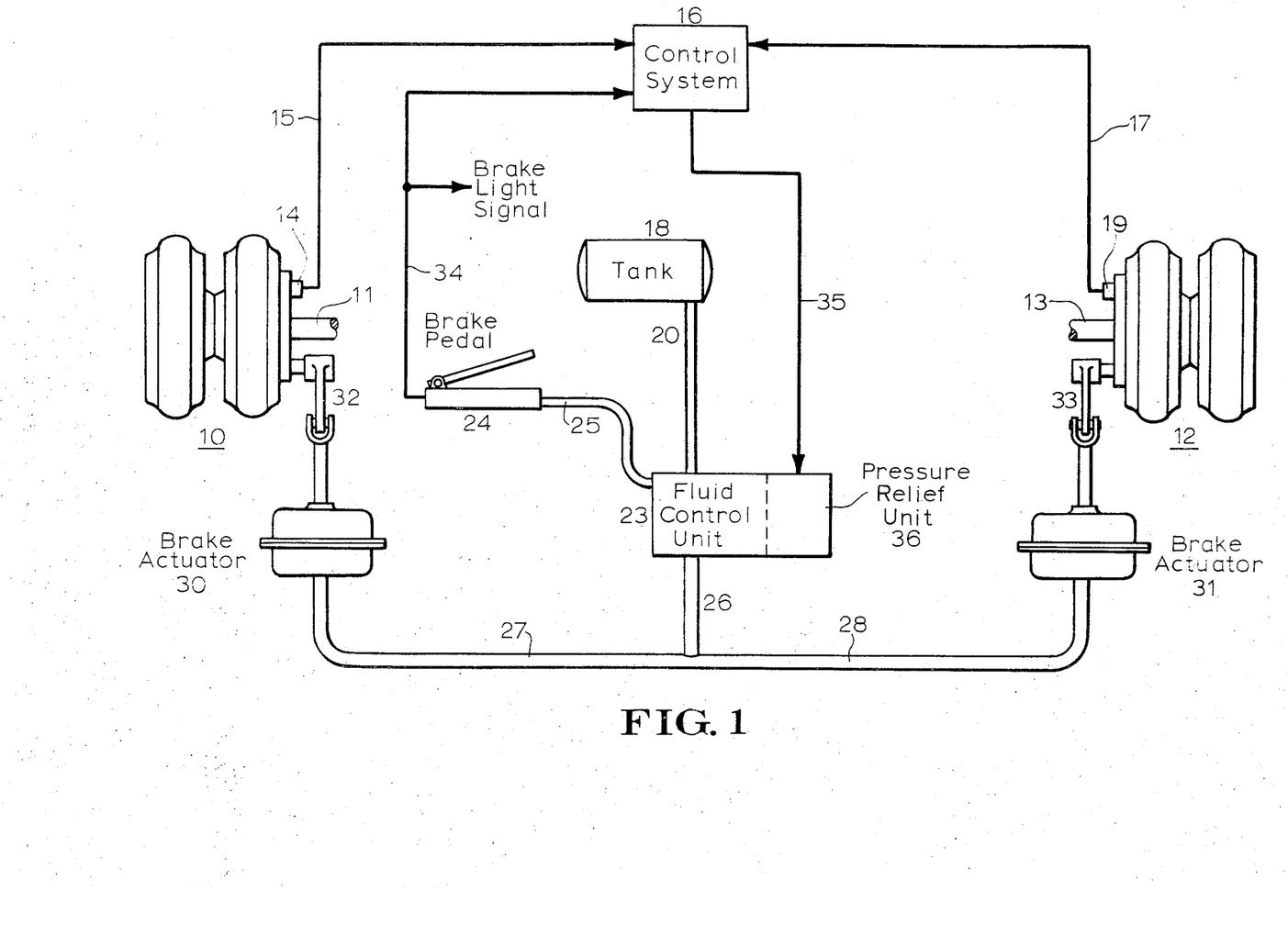
FIG. 1 is a system diagram depicting components of a regulated braking arrangement coupled to a pair of wheel assemblies.

FIG. 1 shows a first wheel assembly 10 mounted on a first axle 11 of the truck, and a second wheel assembly 12 mounted on a second axle 13. A first sensor 14 is positioned adjacent wheel assembly 10 to provide a first wheel velocity-indicating signal on line 15 for application to control system 16 of this invention. A second sensor 19 is disposed adjacent second wheel assembly 12 to provide another wheel speed-indicating signal on line 17 which is also supplied to the control system. Sensors 14, 19 can be of the conventional magnetic type in which disturbance of a magnetic field is sensed to provide an electrical signal to the control system. Other types such as proximity sensors, tachometer installations, or other units can be employed so long as the output indications are, or can be converted to, electrical signals which vary as a function of the respective wheel speeds.

The braking system includes a tank 18 for retaining a fluid such as air under pressure. Air passes through conduit 20 to fluid control unit 23. When brake pedal assembly 24 is actuated to pass a signal over conduit 25 to the fluid control unit, then unit 23 passes the pressurized fluid to conduit 26 and through conduits 27, 28 to the brake actuators 30, 31. Brake actuator 30 operates in a well known manner over brake linkage 32 to apply the brakes to the wheel assembly 10. Brake linkage 33 likewise is coupled between brake actuator 31 and the brakes on the second wheel assembly 12.

At the same time a fluid signal is provided by the brake pedal assembly, an electrical control signal is also provided and passed over line 34 to an input connection of control system 16. This signal can be taken from the circuit which normally energizes the brake lights on the tractor and/or trailer of the truck units. Control system 16 is effective, when an excessive deceleration of either wheel assembly is sensed, to provide an output signal over line 35 to pressure relief unit 36 which is associated with fluid control unit 23. The pressure relief unit can be a solenoid valve combination such that upon receipt of the electrical output signal over line 35, the valve portion is displaced to relieve the pressure normally passed to the brake actuators and prevent lock-up of the wheel assemblies.

GENERAL CONTROL SYSTEM DESCRIPTION

Figure 2:
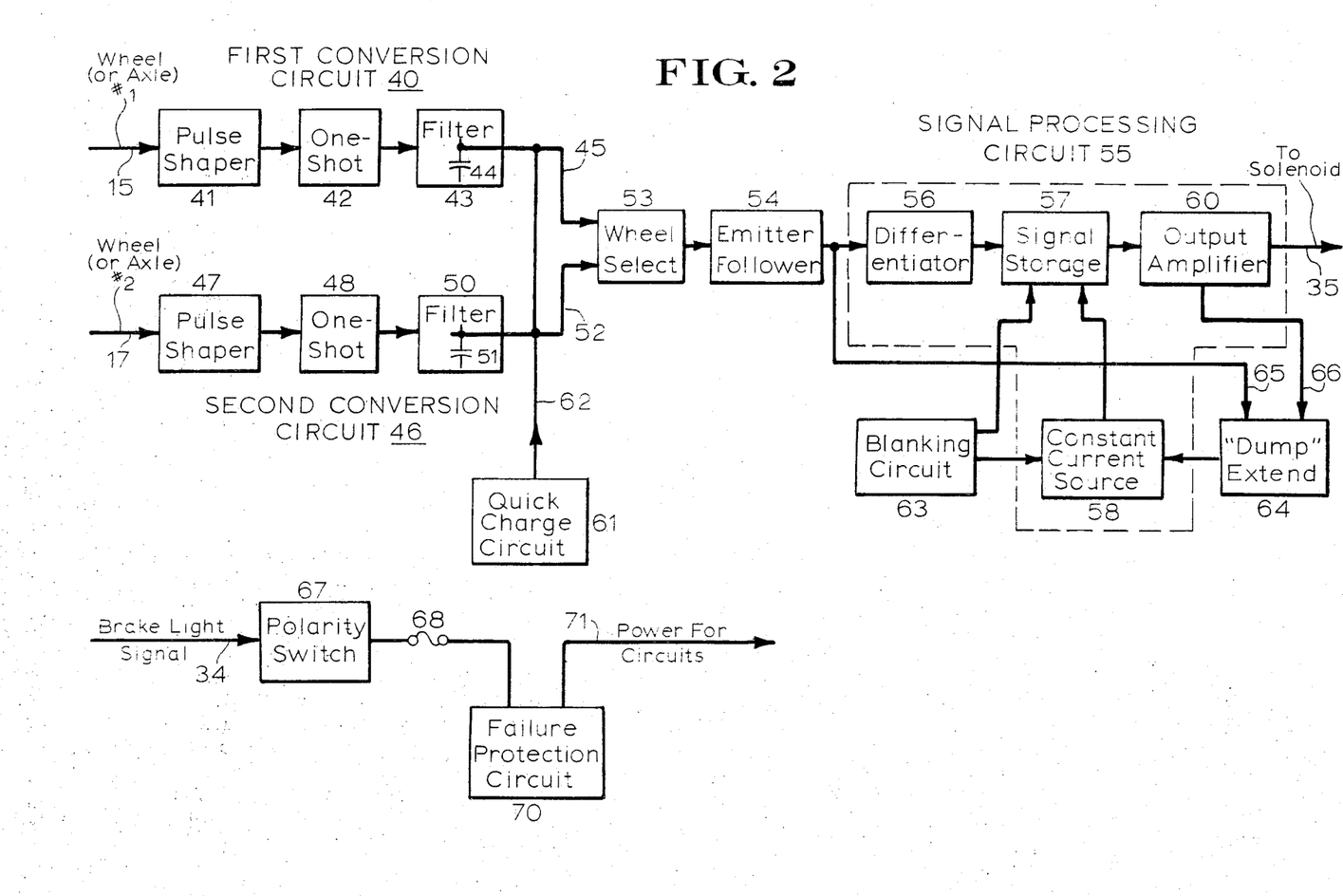
FIG. 2 is a block diagram depicting various stages of a control system constructed in accordance with this invention.

FIG. 2 depicts in a general block arrangement the various stages of control system 16. As there shown, the first wheel velocity-indicating signal on line 15 is applied to a first conversion circuit 40 which includes a pulse shaper stage 41, a one-shot or multivibrator stage 42, and a filter or integrator stage 43 which has a capacitor 44 in its output portion. In these conventional stages the velocity-signifying pulses on line 15 are first passed to stage 41 to provide accurate triggering pulses. In stage 42 well-defined pulses at a frequency varying as the wheel frequency are provided. These well-defined pulses are integrated in circuit 43 to provide a control signal on line 45 which varies as a function of the velocity of wheel assembly 10. In a similar manner second conversion circuit 46 includes related stages, that is, a pulse shaper 47, a one-shot or multivibrator stage 48, and an output filter stage 50 having a capacitor 51 for providing a control signal on line 52 which varies as a function of the velocity of second wheel assembly 12. A wheel select circuit 53 is connected to receive both the first and second control signals on line 45 and 52, and to pass only one of these control signals to emitter follower stage 54. For example the higher value control signal can be chosen in circuit 53 so that the subsequent circuit operations will be related to the higher speed of the two wheel assemblies 10 and 12.

The control signals thus selected is passed through emitter follower stage 54 to a signal processing circuit 55, which includes a differentiator stage 56, a signal storage stage 57 which receives one input signal from the differentiator stage 56 and a reference input signal from constant current source 58, and an output amplifier stage 60 coupled to the signal storage stage 57. Briefly the four stages in signal processing circuit 55 cooperate to provide an output signal on line 35 responsive to a change in some parameter of the received control signal which signifies that the rate of change of wheel velocity represented by the received control signal has exceeded a preset value. This output signal is then applied to the pressure relief unit depicted generally in FIG. 1 to relieve the system braking pressure and obviate wheel lock-up with consequent skidding.

It is emphasized that the wheel select circuit 53 is not a prerequisite to the inventive combination. For some applications it may be desired to have only a single control signal provided over either line 45 or 52, which signal can then be supplied directly to the input side of the signal processing circuit 55. An important component of this invention, whether one, two or more conversion circuits are utilized, is a quick-charge circuit represented by stage 61 and coupled over line 62 to the output side of both filter stages 43 and 50. Circuit 61 operates, when the braking command is provided over line 34, to rapidly establish an initial value of the control signal, as represented by the charge on capacitor 44 in filter circuit 43, and/or the charge on capacitor 51 in filter circuit 50. Because these circuits include rapid discharge arrangements, as will be explained in connection with FIG. 3, this artificial initial value of the control signal is rapidly conformed to a value representing the actual wheel velocity connoted by the pulse trains on lines 15 and 17. However the time required to pass these pulse trains through the respective conversion circuits 40 and 46 to provide the initial values of the control signals is substantially reduced by inclusion of quick-charge circuit 61. Because the rapid rate of change of the control signal during the quick charge time period, another feature of the invention is a blanking circuit 63 coupled to both the signal storage stage 57 and the constant current source 58 in the signal processing circuit 55. The blanking circuit effectively disables the signal processing circuit during the quick-charge interval -- and slightly longer than this interval — to prevent the issuance of a false output signal over line 35 during the initial rapid change of the control signal at the output sides of the conversion circuits.

Another important component of the control system is a dump extend circuit 64. This circuit receives a first, or velocity-indicating, input signal over line 65 which varies as a function of the control signal passed to the signal processing circuit 55. A second input signal is provided from output amplifier 60 over line 66 to the dump extend circuit whenever an output signal is being supplied over line 35 to the pressure relief unit. When the velocity-indicating signal on line 65 drops below a predetermined threshold level at the same time a signal is present on line 65, the dump extend circuit modifies the operation of constant current source 58 and thus of the signal processing circuit to prolong the duration of the output signal on line 35. This extension of the pressure relief time in the controlled braking cycle is important for operation on low coefficient of friction surfaces, and for systems with large hysteresis in the brakes themselves.

The input brake light signal on line 34 is passed through a polarity switch 67 and a protective fuse 68 to a failure protection circuit 70. Polarity switch 67, similar to a conventional rectifier bridge arrangement, insures that systems with other than a conventional negative ground arrangement, or human error by those installing the control system, does not provide energizing voltage of the wrong polarity to the circuits already described. Failure protection circuit 70 provides power over line 71 to the stages shown in the upper portion of FIG. 2 whenever the system operating conditions are within preassigned normal limits. With this general perspective of the control system, a more detailed explanation of the exact circuits and their operation will now be set out.

DETAILED DESCRIPTION OF THE INVENTION

Figure 3:
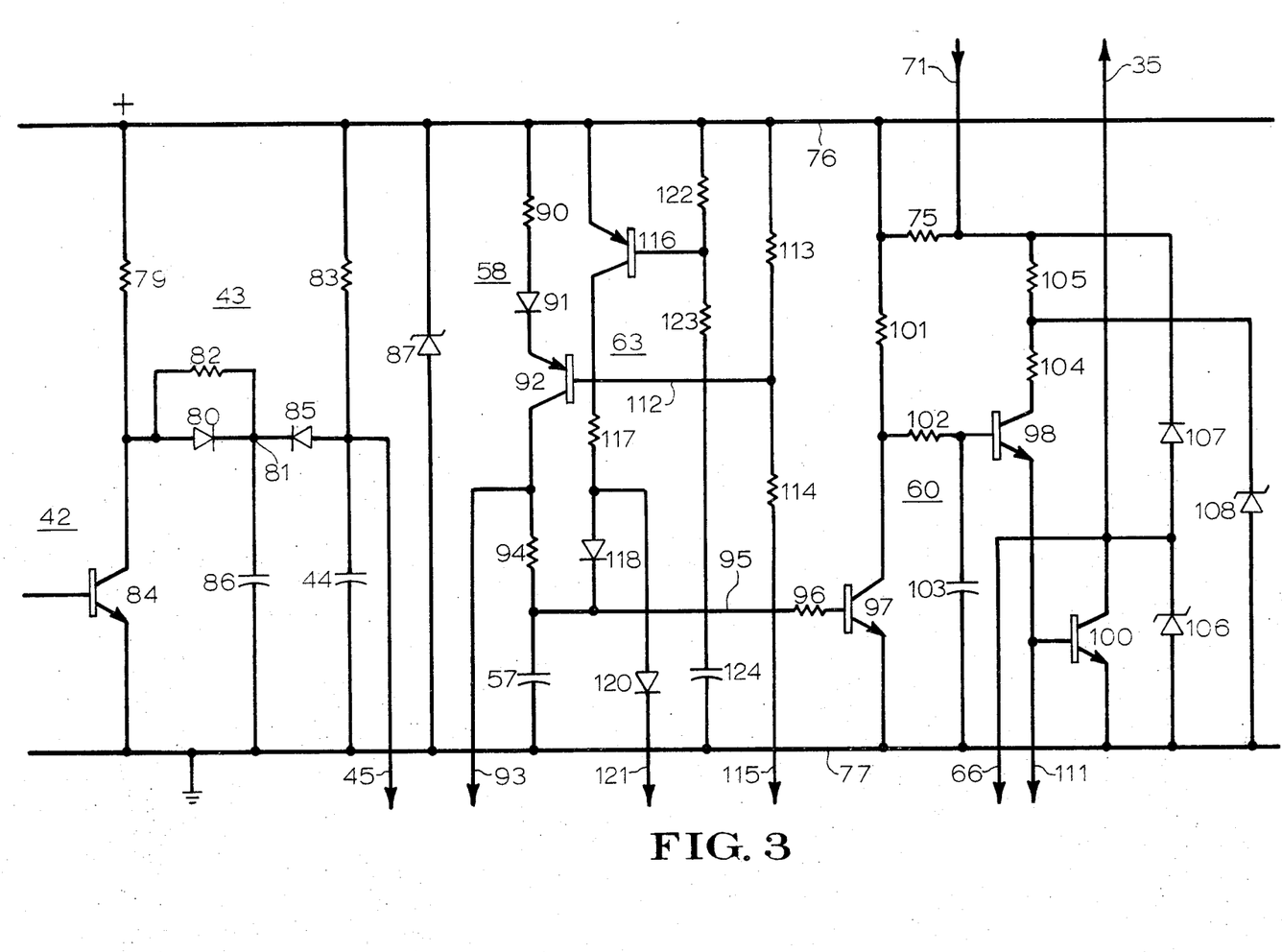
FIGS. 3 and 4 are schematic diagrams supplying circuit details for certain of the stages shown as blocks in FIG. 2.
Figure 4:
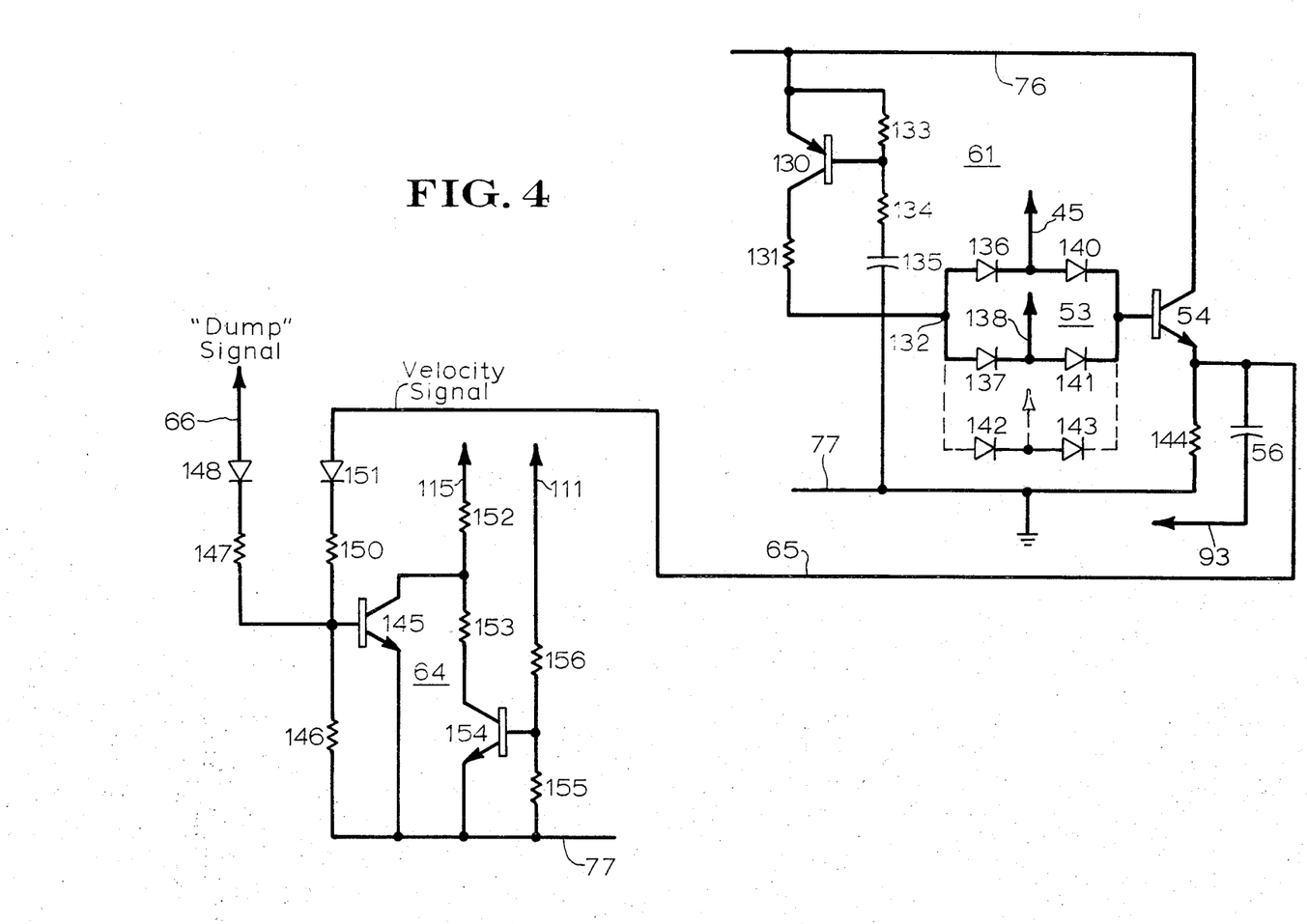

FIG. 3 shows a part of one-shot circuit 42 and all of filter stage 43 of first conversion circuit 40, stages 57, 58 and 60 of the signal processing circuit 55, and blanking circuit 63 of this invention. The details of differentiator stage 56, quick-charge circuit 61, wheel select circuit 53, emitter follower 54, and dump extend circuit 64 are depicted in FIG. 4. The pulse shaper and one-shot stages such as 41, 42 are not set out in detail, as these are well understood and frequently used stages. Likewise the filter circuit 50 at the output side of the second conversion circuit is not shown, as it is identical to that of filter 43 in FIG. 3. Details of the polarity switch 67 and failure protection circuit 70 are not set out as they are not necessary to an understanding of the present invention. Whenever the braking system is actuated by depressing the brake pedal, the power for the circuits shown is supplied over conductor 71 and resistor 75 to energizing conductor 76 in FIG. 3. Ground or reference conductor 77 is also coupled (over conductors not shown) to the polarity switch 67. Accordingly whenever a braking command is provided, a potential is supplied to conductor 76 which is positive with respect to the potential on ground conductor 77.

Filter stage 43 receives a train of equal-duration pulses from the collector of transistor 84 in one-shot stage 42. Stage 43 includes a first diode 80 connected between reference point 81 and the common connection between transistor 84 and resistor 79. A resistor 82 is coupled in parallel with diode 80. Filter 43 also includes a series circuit, comprising a resistor 83 and a capacitor 44, coupled between conductors 76 and 77. A second diode 85 is coupled between point 81 and the common connection between resistor 83 and capacitor 44. Another capacitor 86 is connected as shown between terminal 81 and ground conductor 77, to assist in filtering out transients in the circuit. The control signal is developed across capacitor 44 for application over conductor 45 to the wheel select circuit. The quick-charge circuit 61 (FIG. 2) can also supply energy during the initial turn-on time of the circuit over line 45 to the top of capacitor 44, for the rapid charging of this capacitor to quickly establish an initial value of the control signal whenever the braking system is actuated.

A Zener diode 87 is coupled between lines 76, 77 as shown to provide a regulated energizing potential difference. In one embodiment this diode was established at an 8.3 volt level, but the circuit has been operated satisfactorily at 5 volts d-c level. This is important for the reason that, with several trailers coupled to each other, the voltage provided by the tractor battery may be reduced significantly by the time the energizing potential difference is applied to the last trailer in the combination.

Turning now to constant current source 58 in the signal processing circuit, this source comprises a resistor 90, a diode 91, and a PNP type transistor 92. This series circuit is connected in series with resistor 94 and capacitor 57 between conductors 76, 77. As evident from the reference numeral, capacitor 57 functions as the signal storage component in this circuit. The charge level on this capacitor is determined by the constant charging current provided from transistor 92 in the constant current source 58. Conductor 93 is coupled between the emitter of transistor 92 and the top of resistor 94, extending a connection to the differentiator stage 56, to be described subsequently in connection with FIG. 4.

In FIG. 3, when capacitor 57 has achieved a reference level of charge, current from source 58 passes through resistor 94, over conductor 95, resistor 96, and through the base emitter path of an NPN type transistor 97 to ground conductor 77. Transistor 97, and the additional NPN type transistors 98 and 100, are all connected in the output amplifier stage 60. Under normal conditions with the reference charge on capacitor 57, current flow into the base of transistor 97 maintains this unit conducting, and thus transistors 98, 100 are biased off at this time. Under these conditions there is no output signal on line 35, connected to the collector of output transistor 100. For purposes of this explanation, it can be considered that the winding of solenoid is coupled between conductors 71 and 35 so that, upon conduction of transistor 100, a solenoid energizing signal is provided between these conductors to actuate the pressure relief unit and to "dump" or relieve the pressure in the vehicle braking system.

In the output amplifier stage 60, the collector of transistor 97 is coupled through a resistor 101 to conductor 76, and through another resistor 102 to the base of transistor 98. A capacitor 103 is coupled between ground conductor 77 and the base of transistor 98. The collector of transistor 98 is coupled through resistors 104, 105 to conductor 71 which receives the energizing voltage as the brake light signal is provided. The emitter of transistor 98 is coupled to conductor 111 and to the base of transistor 100, whose emitter is grounded. A Zener diode 106 is coupled between ground conductor 77 and the collector of transistor 100, and another diode 107 is coupled between Zener diode 106 and the common connection between resistors 75 and 105. Another Zener diode 108 is coupled between ground conductor 77 and the common connection between resistors 104, 105. The collector of transistor 100 is coupled to conductor 66 for extending a dump-indicating signal to the dump extend circuit 64. Likewise the base of the same transistor is coupled over conductor 111 to provide a corresponding base drive signal to the dump extend circuit, as will be explained hereinafter.

The conduction level of transistor 92 in the constant current source 58 is determined by the signal received at its base over line 112 from the common connection between resistors 113 and 114. The upper end of resistor 113 is coupled to energizing conductor 76, and the bottom of resistor 114 is coupled over line 115 to another connection in the dump extend circuit. In that the conduction level determines the charge on the capacitor 57, this signal on line 112 can be considered as determining the G-setting against which the deceleration, or change in the control signal, is compared to determine when an output signal must be issued to relieve the braking pressure.

Blanking circuit 63 includes a PNP type transistor 116 and its associated circuit components. That is, the emitter of transistor 116 is coupled to conductor 76, and its collector is coupled through a resistor 117 and a diode 118 to conductor 95. The common connection between resistor 117 and diode 118 is coupled over another diode 120 and conductor 121 to a connection in the other output amplifier where multi-wheel or multi-axle circuits are utilized. For purposes of this explanation it is not necessary to consider this additional circuit.

Another series circuit is coupled in the blanking circuit. This series circuit includes resistors 122, 123 and capacitor 124 connected as shown. The base of transistor 116 is coupled to the connection between resistors 122, 123 so that the conduction of transistor 116 is determined by the signal at this common terminal. When the circuit is first energized as input energy flows from conductor 71 over resistor 75, conductor 76 and the path including components 122-124 to conductor 77, capacitor 124 will gradually charge. However as the charging begins, the current flow through transistor 116, resistor 117 and diode 118 provides a current on conductor 95 to charge capacitor 57 and to forward bias transistor 97, maintaining this transistor conducting and both transistors 98 and 100 non-conducting during the blanking interval. After capacitor 124 has been charged, transistor 116 is no longer forward biased and ceases conduction, removing the blanking signal from diode 118 and conductor 95.

FIG. 4 shows the details of quick-charge circuit 61, wheel select circuit 53, emitter follower 54, differentiator 56, and dump extend circuit 64. Considering first the quick-charge circuit 61, this arrangement includes a PNP type transistor 130, having its emitter coupled to energizing conductor 76, its collector coupled over resistor 131 to a common point 132, and its base coupled to the common connection of resistors 133, 134. The upper end of resistor 133 is coupled to the emitter of the same transistor, and the other end of resistor 134 is coupled over capacitor 135 to ground conductor 77.

Diodes 136, 137 have their anodes coupled to circuit point 132, and their cathodes coupled to the respective conductors 45 and 138. These cathodes are also coupled to the anodes of diodes 140, 141 in wheel select circuit 53, and the cathodes of diodes 140, 141 are coupled to the base of NPN type transistor 154 which is connected as an emitter follower stage.

As the system is initially energized and a voltage appears on conductor 76, transistor 130 in the quick-charge circuit is rapidly driven on and conducts current which flows over resistor 131, diode 136, conductor 45 and capacitor 44 (FIG. 3) to ground. This is the circuit for rapidly establishing the initial value of the control signal across capacitor 44 when the braking system is energized. The quick-charge circuit obviates the necessity of the total time delays that would otherwise be occasioned as the velocity-indicating pulses are shaped in stage 41, extended into equal-duration pulses in stage 42, and filtered in stage 43 to produce the output voltage across capacitor 44. The quick-charge circuit "fools" the filter circuit 43 and artificially inserts an initial control signal, or charge level, across capacitor 44. It is apparent that this initial level of the charge may be higher than the actual wheel velocity. The normal charge circuit for capacitor 44 is from conductor 76 through resistor 83 and capacitor 44 to ground. The time constant for this charge circuit is made substantially longer than the discharge time constant from the top of capacitor 44, through diode 85, resistor 82, and the collector-emitter path of transistor 84 in the output side of one-shot stage 42. Thus the capacitor 44 can rapidly discharge so that the velocity-indicating charge accumulation is rapidly reduced to a level which accurately reflects the actual velocity of the wheel.

Turning again to FIG. 4, as capacitor 135 is charged it reduces the current flow through the base emitter junction of transistor 130 and transistor 130 is shut off, at a time depending upon the time constant of resistor 134 and capacitor 135. This time constant is made shorter than the time constant of resistor 123 (FIG. 3) and capacitor 124 in blanking circuit 63. Accordingly the initial control signal level is established and stabilized while the blanking circuit is still preventing operation of the signal processing circuit, thus avoiding an erroneous pressure relief signal.

The quick-charge signal is also provided over diode 137 and conductor 138 to capacitor 51 in the filter circuit 50, similarly inserting a level of control signal to speed up circuit operation. Additional diodes such as 142, 143 can be provided as shown when additional wheel (or axle) select circuits are provided in a single control system.

For purposes of this explanation, it is assumed that wheel select circuit 53 is connected to select the control signal representing the higher wheel velocity. After the quick charge interval, the velocity-indicating control signal is passed from capacitor 44 over conductor 45 to the anode of diode 140, and the other control signal is likewise provided from the top of capacitor 51 over conductor 138 to the anode of diode 141. Assuming the signal on line 45 is more positive relative to ground than the signal on line 138, diode 140 will conduct and current will flow through the base-emitter circuit of transistor 54 and through resistor 144 to ground. Thus the higher velocity signal is present on capacitor 56 and conductor 65 at the emitter of transistor 54. Diode 140 is conducting, and nearly all the voltage level on its anode is present at its cathode. Thus diode 141 is reverse biased, so that the control signal from the second filter circuit 50 is not used in the control system at this time. Thus diodes 140, 141 and 143 function as unidirectional current conduction means connected in a given sense, as shown, to the first and second conversion circuits, 40, 46 and operate to pass only that control signal which is related to the higher speed wheel or axle assembly.

It is noted that the wheel select circuit can be simply changed to pass only the lower wheel velocity signal. To do this all the diodes 140, 141, 143 and so forth in the wheel select circuit 53 are simply shorted out. Then the diodes (such as 85, FIG. 3) in the conversion circuits, which are connected in a sense opposite the sense in which the diodes in the wheel select circuit are connected, will pass to the emitter-follower stage 54 only that control signal which is related to the lower speed wheel. In addition to shorting out the diodes in the wheel select circuit, the RC output components in all but one of the conversion circuits (such as resistor 83 and capacitor 44 at the output side of the circuit 40) should be removed from the circuit.

In FIG. 4 the dump extend circuit includes an NPN type transistor 145, having its emitter coupled directly to ground conductor 77. The base of this transistor is coupled through resistor 146 to ground; through another resistor 147, diode 148 and conductor 66 to the collector of transistor 100; and through another resistor 150, diode 151 and over conductor 65 to the emitter of transistor 54. The collector of transistor 145 is coupled to the common connection of resistors 152, 153. The other end of resistor 152 is coupled over conductor 115 to the bottom of resistor 114 in the circuit which determines the conduction level of transistor 92 in the constant current circuit. The other end of resistor 153 is coupled through the collectoremitter circuit of another NPN type transistor 154 to ground. The base of transistor 154 is coupled to the common connection between resistors 155 and 156. The other end of resistor 155 is grounded and the other end of resistor 156 is coupled over conductor 111 to the base of transistor 100 and the emitter of transistor 98; this circuit provides a turn-on signal for the base of transistor 154 when the transistors 98, 100 are conducting.

Considering now the operation of the inventive control system, it is assumed for purposes of explanation that the vehicle including wheel assemblies 10 and 12 is initially travelling at a speed of 30 miles per hour (mph), and that brake pedal 24 is then actuated under panic stop conditions, which would ordinarily cause lock-up of the wheels. The signal on line 34 is immediately passed through the polarity switch 67 (FIG. 2), over fuse 68 and failure protection 70 to conductor 71, which passes current through resistor 75 to energizing conductor 76 for energizing the circuit shown in FIGS. 3 and 4. Before capacitor 44 can charge through resistor 83, quick-charge circuit 61 is actuated and current flows over the already-described path and conductor 45 to rapidly charge capacitor 44 to an initial value. For this explanation it will be assumed that this initial value represents a wheel velocity of about 60 miles per hour. Because the time constant of RC circuit 134, 135 is shorter than the time constant of circuit 123, 124, blanking circuit 63 provides a signal through diode 118 to the top of capacitor 57 which prevents actuation of the signal processing circuit 55 at this time. When capacitor 135 reaches a certain charge level quick-charge circuit 61 is disabled as transistor 130 ceases conduction. Capacitor 44 then rapidly discharges through diode 85, resistor 82 and the collector-emitter circuit of transistor 84 in the multivibrator circuit 42 to reach a voltage level connoting a wheel velocity of 30 mph. After capacitor 44 has been both charged to the initial velocity level, and discharged to reach the actual wheel velocity level, the longer time constant of circuit 123, 124 disables transistor 116 and removes the blanking signal from the top of capacitor 57. It is noted that the blanking signal is positive with respect to the potential on the other plate of capacitor 57 or ground. This is also the polarity of the signal provided across capacitor 57 as charging current flows from conductor 76 through resistor 90, diode 91, transistor 92, resistor 94 and capacitor 57 to ground. Hence capacitor 57 acquires a reference charge related to the conduction level of transistor 92. Accordingly this reference charge value or conduction level can be considered analogous to the G-setting of the circuit, against which wheel deceleration signals will be compared. With this positive charge at the top of capacitor 57, transistor 97 is conducting to hold transistors 98 and 100 off. Thus there is no signal over line 35 to relieve the pressure to the brake actuators 30 and 31 at this time.

Assuming now that wheel assembly 10 begins to approach lock-up, this condition rapidly decreases the frequency of the signal from sensor 14 over line 15 to control system 16. This reduces the voltage amplitude at the top of capacitor 44, and this negative-going signal is passed over conductor 45, diode 140, and emitter-follower stage 54 to the top of capacitor 56, the differentiator stage. This capacitor is termed a differentiator because it is coupled in series with line 93 and resistor 94 to the top of signal storage stage 57, in a conventional differentiating circuit configuration. However it appears more appropriate to consider these stages as operated in response to current changes. That is, the positive current from constant current source 58 normally flows through resistor 94 to the top of capacitor 57 to maintain the reference voltage level. As the negative-going signal is passed through capacitor 56, the circuit at the collector of transistor 92 "sees" this lowered voltage, and the current from source 58 is diverted over conductor 93 to supply the defficiency at the lower plate of capacitor 56. This also allows capacitor 57 to discharge through resistor 94 and conductor 93. When capacitor 57 is discharged to the point where it no longer provides forward bias for transistor 97, this trsnsistor becomes non-conducting and the signal at its collector rapidly goes positive. This positive-going signal quickly turns on transistor 98 which in turn switches on output transistor 100 of the output amplifier stage 60. This provides a virtual ground over conductor 35 to one end of a solenoid winding (not shown) in pressure relief unit 36. The other end of the solenoid can be coupled to conductor 71, already energized as the brakes were applied. Thus pressure relief unit 36 is operated to modify the operation of fluid control unit 23 and reduce the pressure in lines 26-28, allowing the wheels to speed up and increase the velocity signal, which charges capacitor 44 more positive. This positivegoing signal is applied over the already-described circuits and capacitor 56 to conductor 93, which thus prevents the diversion of current from source 58. Accordingly the current from transistor 92 rapidly charges capacitor 57 more positive, gating on transistor 97 and turning off transistors 98, 100, removing the signal from conductor 35.

During the described cycle, the conduction level of transistor 92 was determined by the signal on line 112, a function of the voltage divider circuit including resistors 113, 114, 152 and transistor 145. At this time the velocity signal at the emitter of transistor 54 is passed over conductor 65, diode 151 and resistor 150 to the base of transistor 145 in the dump extend circuit. This maintains transistor 145 conducting to complete the described voltage divider circuit. Thus even if transistor 154 is intermittently gated on as the base of transistor 100 goes positive, it does not affect the described voltage divider circuit which controls the conduction level of transistor 92, because the velocity signal on conductor 65 is keeping transistor 145 turned on.

Whenever the "dump" or solenoid-actuating signal is provided on line 35, the same ground signal is also passed over conductor 66, diode 148, and resistor 147 to the base of transistor 145. It is desired to actuate the dump extend circuit 64 when two conditions occur simultaneously. The first condition is that the velocity signal has dropped below a predetermined threshold level, and the second condition is that the output circuit is then signalling a dump or solenoid actuation by the ground signal on conductor 35. For the threshold velocity signal, a certain minimum positive voltage is required to forward bias both diode 151 and the base-emitter circuit of transistor 145. When the level of the velocity signal on conductor 65 drops below this value, there is no current flow through diode 151 to maintain transistor 145 conducting. If at the same time output transistor 100 is conducting, there is a ground on conductor 66 and thus there is no base drive over this circuit, so transistor 145 ceases conduction. However at this time there is base drive for transistor 154 from the base of output transistor 100 over conductor 111, turning on transistor 154 and adding resistor 153 in the voltage divider circuit which determines the conduction level of transistor 92. This in effect reduces the negative bias of transistor 93, providing a reduced current flow through transistor 92 and "flattening" the charging slope curve for capacitor 57. This extends the charging time for capacitor 57 to reach a certain level, or in effect increases the possible time duration of a pressure dump cycle.

Resistor 152 is selected with a particular value to provide the desired G-setting, or signal level on capacitor 57, against which the deceleration signals will be compared. Resistor 153 is the dump extend resistor. The exact electrical values in ohms of these resistors are determined after considering the transistor gain (beta) of transistor 92, and the saturation resistances of transistors 145 and 154. This selection of component values obviates the need for additional potentiometers or other adjustable units to set the G-level and the dump extend time.

While only a particular embodiment of the invention has been described and illustrated, it is manifest that various modifications and alterations may be made therein. It is therefore the intention in the appended claims to cover all such modifications and alterations as may fall within the true spirit and scope of the invention.

What is claimed is:

1. A control system for a vehicle having a plurality of wheels, a braking system including a fluid under pressure, and means for providing an energizing signal responsive to issuance of a command to operate the braking system, which control system comprises:
    a sensor positioned to provide an indication of wheel velocity;
    a conversion circuit, coupled to said sensor, for providing a control signal which varies as a function of said wheel velocity;
    a signal processing circuit, connected to receive said control signal, for providing an output signal responsive to a change in said control signal signifying that the rate of change of said wheel velocity has exceeded a preset value;
    a pressure relief unit, connected to change the pressure in said braking system responsive to receipt of said output signal;
    and which control system is characterized by a quick-charge circuit, coupled to said conversion circuit, for rapidly establishing an initial value of said control signal upon issuance of said command to operate the braking system, thus reducing the time interval required for said control signal to denote the actual wheel velocity.

2. A control system as claimed in claim 1, and further comprising a blanking circuit, coupled to said signal processing circuit, for preventing operation of said signal processing circuit until said initial value of the control signal has been established in the conversion circuit, thus precluding erroneous actuation of the pressure relief unit as the control system initially receives said energizing signal.

3. A control system for a vehicle having a plurality of wheels, a braking system including a fluid under pressure, and means for providing an energizing signal responsive to issuance of a command to operate the braking system, which control system comprises:
    first and second sensors positioned to provide indications of the velocities of first and second wheels;
    first and second conversion circuits, respectively coupled to said first and second sensors, for providing first and second control signals which vary as a function of said wheel velocities;
    a wheel select circuit, connected to receive both of said control signals and to pass only one control signal;
    a signal processing circuit, connected to receive said control signal passed by the wheel select circuit, for providing an output signal responsive to a change in the received control signal signifying that the rate of change of the wheel velocity represented by the received control signal has exceeded a preset value;
    a pressure relief unit, connected to change the pressure in said braking system responsive to receipt of said output signal;
    a quick-charge, coupled to both said conversion circuits, for rapidly establishing an initial value of said control signals upon issuance of said command to operate the braking system, thus reducing the time interval required for said control signal to denote the actual wheel velocity; and
    a dump extend circuit, connected to receive both a first input signal which varies as a function of said control signal and a second input signal which indicates said output signal is then being supplied to the pressure relief unit, effective to modify operation of said signal processing circuit so as to prolong the possible duration of said output signal whenever the first input signal drops below a predetermined value at the same time that the second input signal is being received.

4. A control system for a vehicle having a plurality of wheels, a braking system including a fluid under pressure, and means for providing an energizing signal responsive to issuance of a command to operate the braking system, which control system comprises:

a sensor positioned to provide a train of pulses at a frequency which is an indication of wheel velocity;

a conversion circuit, connected to receive the train of pulses, and including a capacitor for developing a d-c control signal which varies as a function of said wheel velocity;

a signal processing circuit, connected to receive said d-c control signal, for providing an output signal responsive to a change in said control signal signifying that the rate of change of said wheel velocity has exceeded a preset value;

a pressure relief unit, connected to change the pressure in said braking system responsive to receipt of said output signal;

and which control system is characterized by a quick-charge circuit, coupled to the capacitor in said conversion circuit, for rapidly establishing an initial value of said d-c control signal across said capacitor upon issuance of said command to operate the braking system, thus reducing the time interval required for said d-c control signal to denote the actual wheel velocity, which quick-charge circuit includes a first transistor connected to conduct and pass charging current to said capacitor, and a first RC circuit connected to terminate conduction of the first transistor after a preset time period.

5. A control system as claimed in claim 4, and further comprising a blanking circuit, coupled to said signal processing circuit, which blanking circuit includes a second transistor connected to conduct and prevent operation of said signal processing circuit until said initial value of the control signal has been established in the conversion circuit, and which blanking circuit also includes a second RC circuit connected to terminate conduction of said second transistor at a time after said preset time period has elapsed, thus precluding erroneous actuation of the pressure relief unit as the control system initially receives said energizing signal.

6. A control system for a vehicle having a plurality of wheels, a braking system including a fluid under pressure, and means for providing an energizing signal responsive to issuance of a command to operate the braking system, which control system comprises:

a sensor positioned to provide an indication of wheel velocity;

a conversion circuit, coupled to said sensor, for providing a control signal which varies as a function of said wheel velocity;

a signal processing circuit, including a signal storage capacitor, a constant current source having a first transistor which passes current to said signal storage capacitor, a voltage divider circuit for determining the conduction level of said first transistor, a differentiator stage coupled between said conversion circuit and the signal storage capacitor to divert current from the constant current source and the signal storage capacitor responsive to a change in said control signal signifying that the rate of change of said wheel velocity has exceeded a preset value, and an output amplifier connected to provide an output signal when the current is diverted as said control signal changes;

a pressure relief unit, connected to change the pressure in said braking system responsive to receipt of said output signal;

and which control system is characterized by a dump extend circuit, including a second transistor connected in said voltage divider circuit to modify the conduction level of said first transistor responsive to a change in state of said second transistor, which second transistor is connected to receive both a velocity-indicating input signal which varies as a function of said control signal and a dump-indicating input signal which indicates said output signal is then being supplied to the pressure relief unit, effective to modify operation of said signal processing circuit by reducing the conduction level of said first transistor to prolong the possible duration of said output signal whenever the velocity-indicating input signal drops below a predetermined value at the same time that the dump-indicating input signal is being received.

* * * * *